United States Patent
Hellman et al.

(10) Patent No.: US 6,912,638 B2
(45) Date of Patent: Jun. 28, 2005

(54) SYSTEM-ON-A-CHIP CONTROLLER

(75) Inventors: Timothy M. Hellman, Concord, MA (US); Neil B. Epstein, Sudbury, MA (US); Steve J. Pratt, Acton, MA (US); Fred W. Andree, Brookline, MA (US); Karl M. Marks, Somerville, MA (US); Joerg Landmann, Dortmund (DE); James W. Brissette, W. Boylston, MA (US)

(73) Assignee: Zoran Corporation, Sunnyvale, CA (US)

( * ) Notice: Subject to any disclaimer, the term of this patent is extended or adjusted under 35 U.S.C. 154(b) by 509 days.

(21) Appl. No.: 10/185,791

(22) Filed: Jun. 28, 2002

(65) Prior Publication Data
US 2004/0046761 A1 Mar. 11, 2004

Related U.S. Application Data
(60) Provisional application No. 60/302,138, filed on Jun. 28, 2001.

(51) Int. Cl.[7] .............................................. G06F 12/00
(52) U.S. Cl. ..................... 711/167; 345/534; 345/571
(58) Field of Search ................................. 365/220, 221, 365/230.05; 345/533, 534, 571; 358/1.15, 1.16; 711/167, 168

(56) References Cited

U.S. PATENT DOCUMENTS

| | | | |
|---|---|---|---|
| 5,511,151 A | * 4/1996 | Russell et al. ............. 358/1.15 |
| 5,598,545 A | 1/1997 | Childers et al. ............ 395/562 |
| 5,752,074 A | 5/1998 | Gallup et al. ............... 395/800 |
| 5,822,606 A | * 10/1998 | Morton ........................ 712/16 |
| 5,860,084 A | 1/1999 | Yaguchi ..................... 711/105 |
| 5,940,087 A | 8/1999 | Katsura et al. ............. 345/511 |
| 6,070,003 A | 5/2000 | Gove et al. ................. 395/312 |
| 6,085,275 A | 7/2000 | Gallup et al. ............... 710/131 |
| 6,317,819 B1 | 11/2001 | Morton ........................ 712/22 |
| 6,335,898 B2 | 1/2002 | Watanabe et al. ........... 365/230 |
| 6,370,558 B1 | 4/2002 | Guttag et al. ............... 708/603 |

FOREIGN PATENT DOCUMENTS
EP  0 552 565 A2  7/1993

* cited by examiner

Primary Examiner—Pierre M. Vital
(74) Attorney, Agent, or Firm—Goodwin Procter LLP

(57) ABSTRACT

A system-on-a-chip controller having a first processor and a second processor. The first processor provides control processing and image processing. The second processor provides image processing. The processors receive data from an external source through a data bus. Also, the controller can include a third controller to provide I/O functionality to an external device. The second processor processes the stored data in either a row or column configuration. A fixed-length instruction word can be decoded into two instructions, an operation instruction and an I/O instruction, and can be used to process the data. The I/O instruction can be disposed in an unused bit field of the operation instruction.

30 Claims, 14 Drawing Sheets

SYSTEM-ON-A-CHIP CONTROLLER

CROSS-REFERENCE TO RELATED APPLICATIONS

This application claims the benefit of U.S. Provisional Patent Application Ser. No. 60/302,138, filed on Jun. 28, 2001, the entire disclosure of which is incorporated herein by reference.

FIELD OF THE INVENTION

The invention generally relates to a system-on-a-chip controller and, more specifically, to a system-on-a-chip controller having a central processing core and digital signal processing core.

BACKGROUND OF THE INVENTION

In the field of signal processing, system-on-a-chip controllers are becoming more common and more powerful. Typically, they involve the combination of a central processing unit (CPU) (e.g., a microprocessor) core to provide control functionality and a digital signal processing (DSP) core to provide signal processing. Often, the CPU and DSP functionalities are tightly coupled. That is, DSP processing is often armed and executed, and the CPU core waits for the DSP core to finish.

The DSP core of the system-on-a-chip controller, can include a number (e.g., four) parallel pipeline execution paths. The pipeline execution paths are also referred to data processing paths. The parallel paths facilitate the processing of greater amounts of data than with a single path. Data from a source external to the DSP core (e.g., an external memory) can be read into a local memory of the DSP core by a direct memory access (DMA) module. The data is stored in the local memory in a manner determined by the DMA. Usually, the data is stored in either a per-data path model or a globally accessible scheme. When stored in a per-data path model, the data can be accessed by the respective data paths in parallel. When stored in a globally accessible scheme, each data path can access the entire memory, but the processing times are increased due to the increased number of reads needed to get data to each data processing path.

Data processing instructions that are executed by the data processing paths are retrieved (i.e., fetched) from an instruction cache, decoded, and issued on a per clock cycle basis. Various known forms of data processing instructions are used to increase the speed and the amount of data that can be processed by the DSP core.

For example, it is known that super-scalar processing architectures allow for multiple simultaneous instruction fetches and decodes. However, often not all the fetched instructions are allowed to be issued to the respective execution units. Hardware performs a series of checks to determine which instructions can be issued simultaneously. These checks adversely impact the clock speed and processing of the DSP core.

In addition, another processing architecture, known as the Very Long Instruction Word (VLIW) architecture, extends the amount of instructions that can be fetched and issued simultaneously beyond the super-scalar architecture. Similar to super-scalar processing, multiple simultaneous instruction fetches and decodes are performed. However, in a VLIW architecture, the checks to determine whether instructions can be issued simultaneously are typically performed by the compiler.

Still another known approach to improving the throughput of DSPs is the use of the Dense Instruction Word (DIW) architecture. In contrast to super-scalar and VLIW architectures in which the execution units in the data processing path are in parallel, the execution units in the DIW architecture are ordered in a sequential pipeline. A single instruction word defines an operation for each (e.g., four) of the sequential processing stages as the data progresses through the pipeline. As such, up to four operations per instruction are performed on the data. However, a separate instruction is needed to load new data to be processed by the data processing path, thus slowing the overall processing speed of the DSP core.

SUMMARY OF THE INVENTION

In one aspect, the invention is directed to a programmable system-on-a-chip controller. The controller includes an interface module that receives data from and sends data to an external device, a data bus in communication with the interface, and a first processor module. The first processor module is in communication with the data bus, and provides control processing and image processing of the data received from the external device. The controller also includes a second processor module. The second processor module is also in communication with the data bus, and provides additional image processing of the data received from the external device.

In one embodiment, the interface includes a third processor that is in communication with the first processor. The third processor provides I/O to an external device to, for example, control the external device. The processor can control devices, such as a printer, a printer feed motor, carrier motor, position sensor, and a print head.

In another aspect, the invention is directed to a method of formatting data in a local memory of a digital signal processor for use by a plurality of data processing paths. The method includes the steps of receiving data from a first external data location in a first format or a second format, and storing the data in the local memory in either a row configuration or a column configuration. The data is stored in a row configuration when the data is received in the first format. The data stored in the row configuration is accessible by each respective data processing path sequentially. The data is stored in a column configuration when the data is received in the second format. The data stored in the column configuration is accessible by a respective one of the plurality of the data processing paths in parallel. The data can also be simultaneously stored in both the row configuration and the column configuration. Also, data received in the first configuration can be broadcast and stored in the column configuration.

In one embodiment, the external source can be a camera, a scanner, a printer, a fax modem, a parallel flash memory, a serial flash memory, a DRAM, a universal serial bus host, a network device, and an IEEE 1394 device, through a direct memory access module. The data can be transferred from the external data source in longwords. The direct memory access module formats the data in either the first format or the second format for storage. A programmer of the system-on-a-chip controller can control the storage format by setting a bit field.

In another embodiment, the method includes the step of transferring a portion of the data stored in the row configuration to a single one of the plurality of data paths during a clock cycle sequentially. The data processing paths can process byte, word, and longword sized data and also increment an address register associated with each respective data processing path by the size of the operand, for example, a byte, a word, or a longword.

In another embodiment, the method includes the step of transferring a portion of the data stored in the column configuration to each of a respective one of the plurality of data paths during a clock cycle in parallel. The data processing paths can process byte, word, and longword sized data and also increment an address register associated with each respective data processing path by the size of the operand, for example, a byte, a word, or a longword.

In another aspect, the invention is directed to a method of processing data by a digital signal processor. The method includes the step of fetching a single fixed-length instruction word. The instruction word includes at least two independent instructions. The method also includes the steps of decoding the instruction word to generate an operation instructions and an I/O instruction, the I/O instruction being disposed in an unused bit field of the operation instruction, and issuing the operation instruction and I/O instruction in parallel.

In one embodiment, the method includes the step of encoding a fixed-length instruction word. The instruction word includes the operation instruction and the I/O instruction. The I/O instruction can be a read instruction or a write instruction. The method can include the step of stalling the execution of the operation instruction when data to be processed by the operation instruction is not available.

In another aspect, the invention is directed to a digital signal processor core. The core includes a crossbar switch, a local memory, and plurality of data processing paths. The local memory communicates with the crossbar switch. The local memory is configured to store data received from an external memory source in a first format or a second format. The first format is a row format and the second format is a column format. The plurality of data processing paths communicate with the crossbar switch. Each one of the plurality of data processing paths is able to sequentially access any local memory when the data is stored in the first format or a respective subset of the local memory in parallel when the data is stored in the second format via the crossbar switch.

In one embodiment, the digital signal processor includes a direct memory access module in communication with the local memory configured to format the data to be stored in the local memory in either the first format or the second format. The digital signal processor can also include an address register unit associated with each of the respective the data processing paths. The address register unit stores the local memory addresses that the data paths access to retrieve data to process. The address register can be automatically incremented by the size of the operand, for example, a byte, a word, or a longword.

In another embodiment, the digital signal processor includes a decode module in communication with the plurality of data processing paths. The decode module decodes an instruction word into an operation instruction and an I/O instruction. The I/O instruction can be disposed in an unused bit field of the operation instruction.

In another embodiment, the plurality of data processing paths include a register file module, an extractor module, a multiplier module, an arithmetic logic unit module, and an inserter module. The modules provide data processing on the data stored in the local memory.

BRIEF DESCRIPTION OF THE DRAWINGS

The invention is pointed out with particularity in the appended claims. The advantages of the invention may be better understood by referring to the following description taken in conjunction with the accompanying drawing in which:

FIGS. 5A and 5B are graphical representations of embodiments of the first and second data formats of the present invention;

DETAILED DESCRIPTION OF THE INVENTION

Figure 1A:
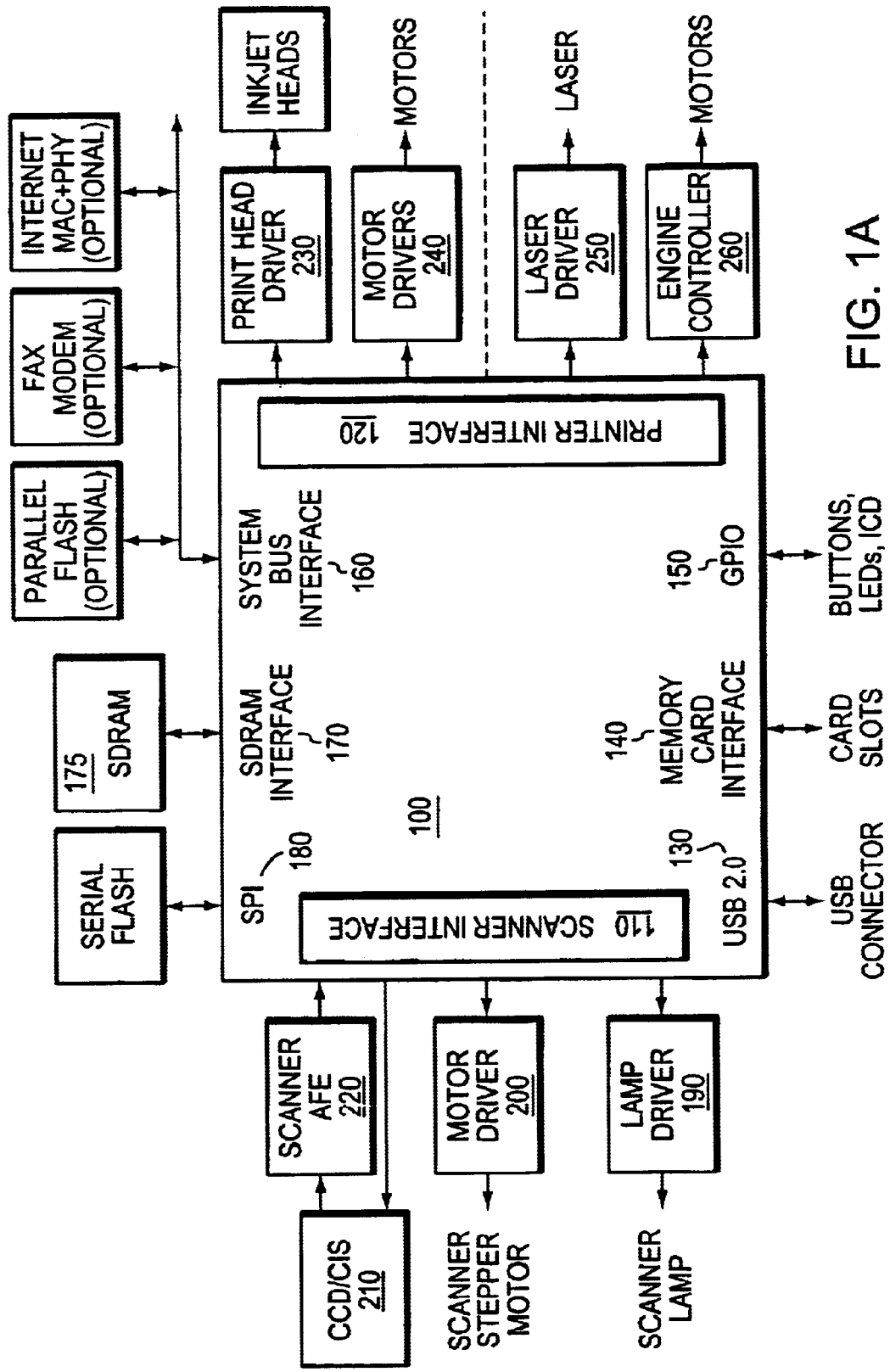
FIG. 1A is a block diagram depicting an embodiment of a system-on-a-chip controller and interfaces constructed in accordance with the principles of the invention.
Figure 1B:
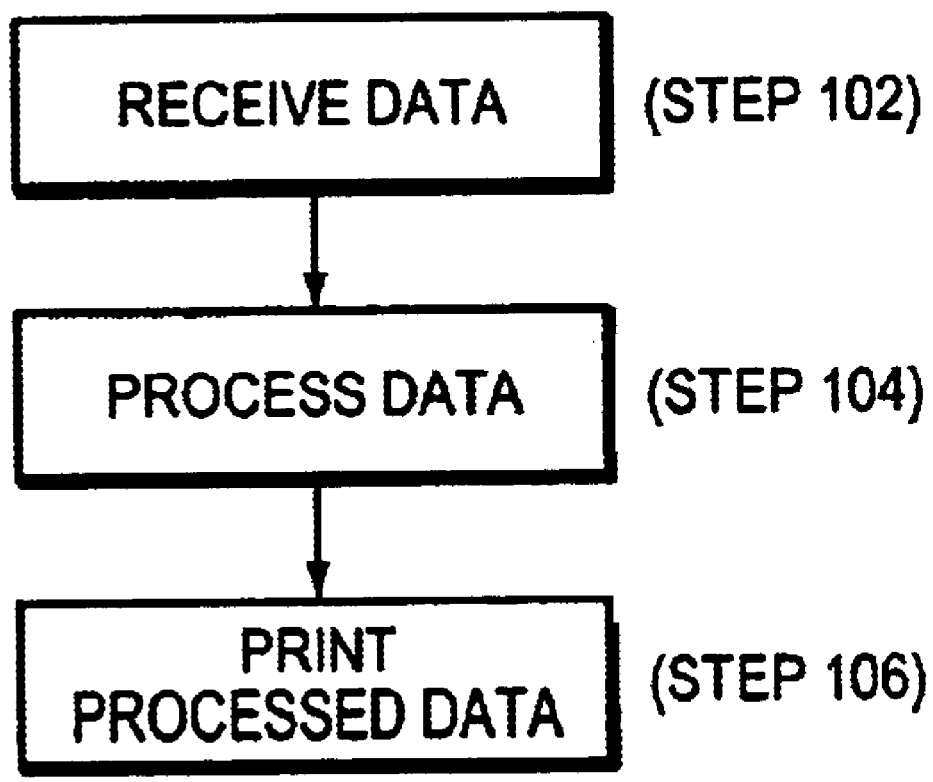
FIG. 1B is a flow chart depicting an embodiment of the general operation of the system-on-a-chip controller of FIG. 1A.

The present invention is directed to a system-on-a-chip controller that provides increased processing efficiency. The system-on-a-chip controller can be incorporated into multi-function peripheral devices, such as scanners, printers, and fax machines to provide image processing, although other data processing applications are within the scope of the invention. With reference to FIGS. 1A and 1B, in one embodiment the invention includes a system-on-a-chip controller 100 having a scanner interface 110, an printer interface 120, a universal serial bus (USB) interface 130, a memory card interface 140, a general purpose input/output (GPIO) interface 150, a system bus interface 160, an SDRAM interface 170, and an serial peripheral device (SPI) interface 180.

The scanner interface 110 is in communication with a lamp driver module 190, a motor driver 200 module, a charge couple device and contact image sensor (CCD/CIS) module 210, and a scanner AFE module 220. The CCD/CIS module 210 is also in communication with scanner interface 110 via the scanner AFE module 220. The lamp driver module 190 controls a scanner lamp. The motor driver module controls a scanner stepper motor. The scanner interface 110 provides image or other data (STEP 102) for processing by the system-on-a-chip controller 100. In addition, the system-on-a-chip controller 100 issues control signals to the scanner interface 110 to control the manner in which the image data is received by the system-on-a-chip controller 100.

The system-on-a-chip controller 100 can also receive image data (STEP 102) from any of the other interfaces connected to peripheral devices or hosts. For example, a host device having a USB port can transfer data to the system-on-a-chip controller 100 via the USB interface 130. As shown, data can be received from a variety of sources (e.g., serial flash memory, SDRAM (which is also referred to as system memory 175 throughout the specification), parallel flash memory, card slots, buttons, a fax modem, an IEEE 1394 device, or an Ethernet interface) through a respective one of the memory card interface 140, the GPIO interface 150, the system bus interface 160, the SDRAM interface 170, and the SPI interface 180.

The system-on-a-chip controller 100 processes the received data (STEP 104) in a manner described in more detail below. The results of the processed data are forwarded to a printing device, such as a laser or inkjet printer via the printer interface 120. When an inkjet printer is used to print the processed data (STEP 106), the printer interface is in communication with a printer head driver module 230 and a motor driver module 240. The print head driver module 230 and motor driver module 240 receive commands from the printer interface 230 and, in turn, control the inkjet heads and the printer motors during the printing of the processed data. If a laser printer is used to print the processed data (STEP 106) the printer interface is in communication with a laser driver module 250 and an engine controller module 260. The laser driver module 250 and engine controller module 260 receive commands from the printer interface 230, and, in turn, control the laser and the motors during printing of the processed data.

Figure 2A:
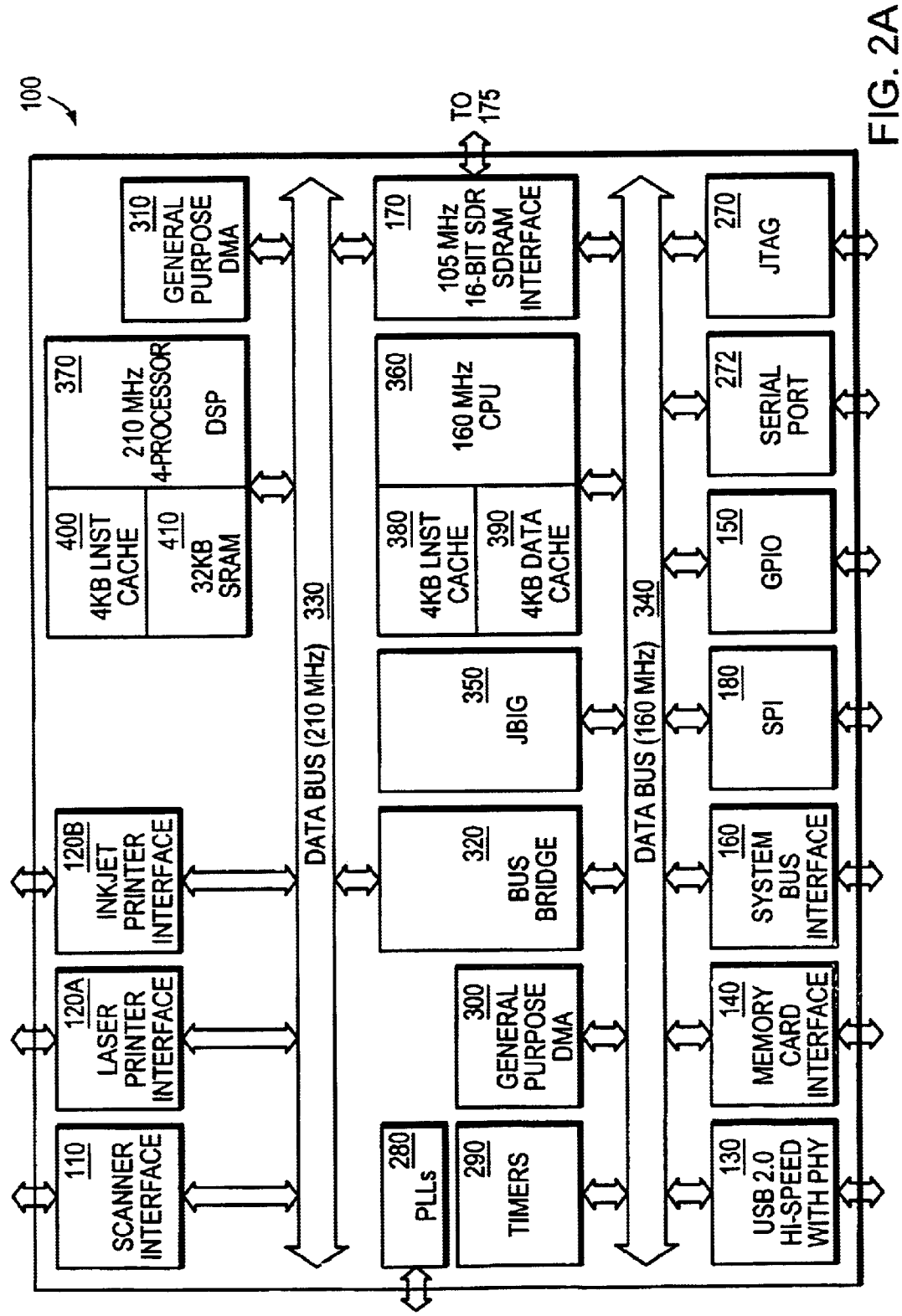
FIG. 2A is a block diagram of a detailed embodiment of the system-on-a-chip controller of FIG. 1.
Figure 2B:
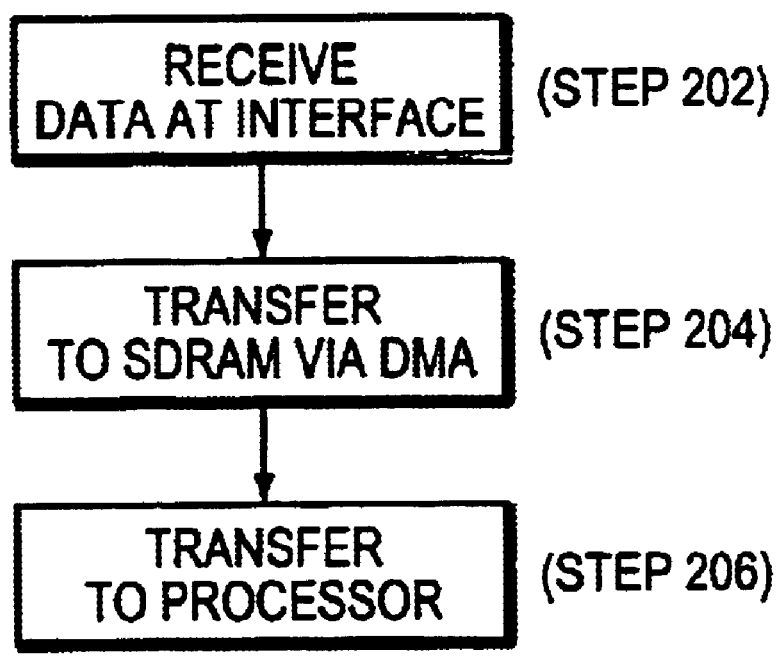
FIG. 2B is a flow chart depicting an embodiment of the steps of transferring data to a processor of the system-on-a-chip controller of FIG. 2A.

With reference to FIGS. 2A and 2B, the system-on-a-chip controller 100 includes a joint test action group (JTAG) interface 270, a serial port interface 272, phase lock loop modules 280, a timer module 290, a first general purpose direct memory access module 300, a second general purpose direct memory access module 310, a bus bridge 320, a first virtual component interconnect (VCI) data bus 330, a second VCI data bus 340, a joint bi-level image experts group (JBIG) compression/decompression module 350, a CPU core 360, and a DSP core 370.

In one detailed embodiment, the CPU core 360 is an ARM946E-S model microprocessor sold by ARM Ltd. of Cambridge, England, running at a clock speed of approximately 160 MHz. Of course, other microprocessor types and speeds are within the scope of the invention. The CPU core 160 includes an instruction cache 380 and a data cache 390. In a detailed embodiment, each of the instruction cache 380 and data cache 390 can be 4 kilobytes in size. The CPU core 360 is in communication with each of the USB interface 130, the memory card interface 140, the system bus interface 160, the SPI interface 180, the GPIO interface 150, the serial port interface 272, the JTAG interface 270, the timer module 290, the first general purpose direct memory access module 300, the bus bridge 320, the JBIG compression/decompression module 350, and SDRAM interface 170 via the second data bus 340. In one detailed embodiment, the second data bus can be a 160 MHz ARM data bus, although other speeds and bus types are within the scope of the invention.

In one embodiment, the DSP core 370 is a single-instruction, multiple-datapath (SIMD) processor. That is, a single instruction word controls the processing operations of multiple data processing paths 480. The DSP core 370 includes an instruction cache 400 and an SRAM module (local memory) 410. In a detailed embodiment, the instruction cache can be a 4 kilobyte cache and the SRAM module can be a 32 kilobyte module. The DSP core is in communication with the scanner interface 110, a laser printer interface 120A, an inkjet printer interface 120B, the bus bridge 320, the second general purpose direct memory access module 310, and the SDRAM interface 170 via the first data bus 330. In a detailed embodiment, the first data bus 330 can be running at 210 MHz, although other speeds are within the scope of the invention. Because the first data bus 330 and the second data bus 340 operate at different speeds, the bus bridge 320 facilitates communication between the interfaces residing on the different data buses.

In accordance with one aspect of the invention, in one embodiment the CPU core 360 and the DSP 370 core cooperate to provide an efficient data processing solution. More specifically, data processing is split between the CPU core 360 and the DSP core 370. The CPU core 360 performs control processing (e.g., motor and lamp speed) and some image processing functions. For example, the CPU core 360 can perform processing functions, such as, outer loop control, histogram analysis, memory management, and Huffman coding. The DSP core 370 performs additional image processing functions. For example, the DSP core 370 can be configured to execute the following image processing algorithms, shading correction, gamma correction, 3×3 matrix multiply, brightness/saturation analysis, background removal, white space skip, filtering, color conversion, screening, image resolution conversion, image scaling, text/photo segmentation, and image compression/decompression.

During operation, the CPU core 360 invokes image processing routines on the DSP core 370 on a per band basis (i.e., multiple lines), rather than on an individual line basis. Per band basis allows the overlap of data transfers and processing of multiple lines of data. In other words, data processing can be executed while data transfers are taking place. In contrast, in per line basis processing, the data for a single line is transferred, processed, and returned before another line of data can be transferred for processing.

The CPU core 360 provides the DSP core 370 with image processing commands. The CPU core 360 allocates input and output buffers in the system memory 175, which is connected to the SDRAM interface 170, and keeps those buffers protected until the DSP core 370 finishes its processing. As such, the DSP core 370, appears to be a "black box" to the CPU core 360. Once the DSP core 370 receives image processing commands, the CPU core 360 performs additional control and image processing functionality in parallel. As such, the present invention provides advantages, such as increased flexibility and improved real-time response when compared to known system-on-a-chip controllers that do not have a DSP core. Additional advantages include modularity, increased processing rates, and a reduction in manufacturing cost as a result of the increased processing efficiency as compared to known system-on-a-chip controllers.

The SDRAM interface 170 facilitates data transfers between the system memory 175 and the CPU core 360 and the DSP core 370. The data is typically not transferred directly to or from the various interfaces to the CPU core 360 or DSP core 370. For example, the first general purpose direct memory access module 330 transfers data received from an external source (STEP 202) to the system memory 175 (STEP 204). In turn, a direct memory access controller transfers the data to be processed from the system memory 175 via the SDRAM interface 170 to the SRAM module 410 of the DSP core 370 (STEP 206).

Figure 3:
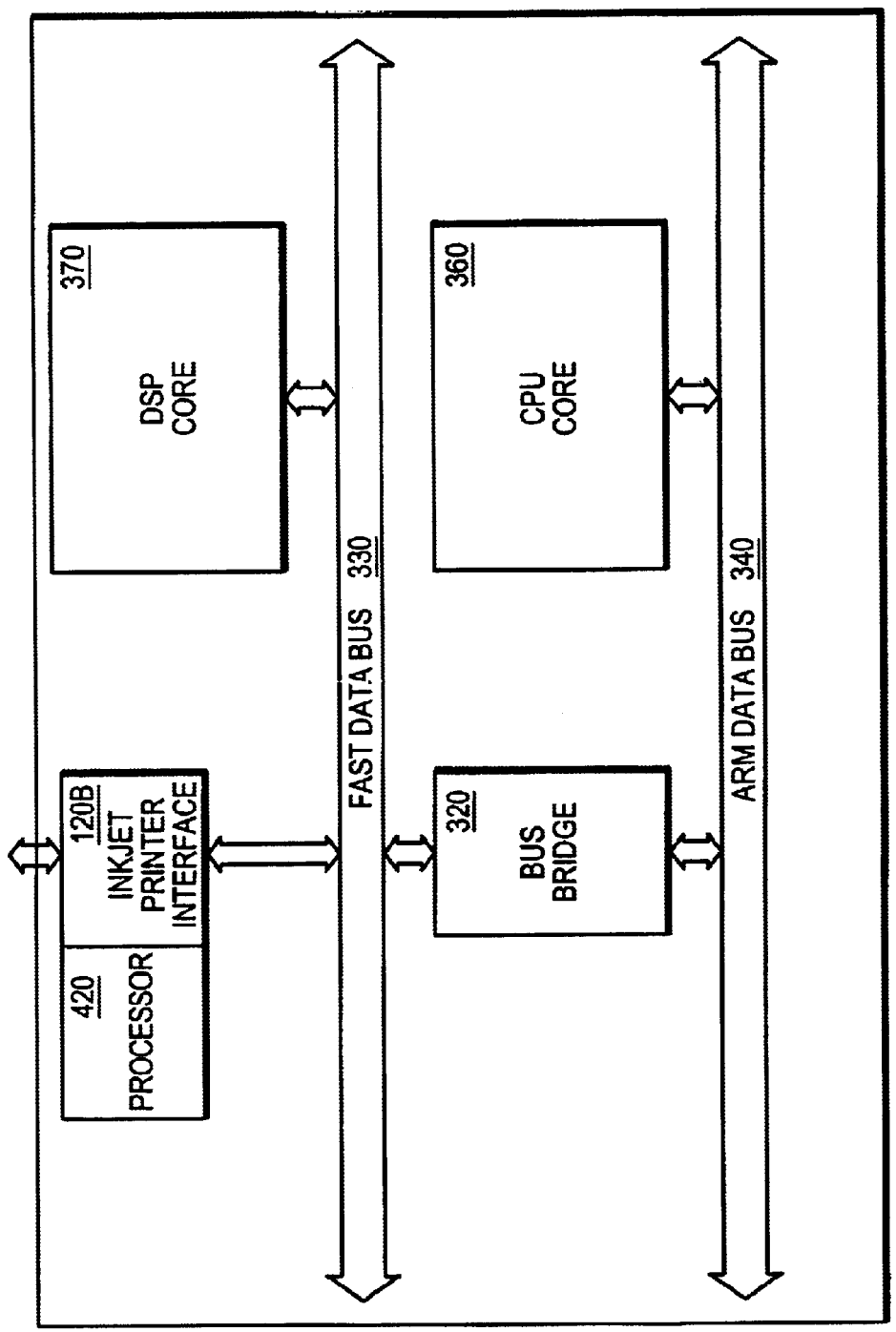
FIG. 3 is a general block diagram of an embodiment of a system-on-a-chip controller constructed in accordance with the principles of the invention.

With reference to FIG. 3, in another embodiment an inkjet interface 120B includes a processor 420 in communication with the CPU core 360. In a detailed embodiment, processor 420 can be an 8-bit RISC processor. The processor 420 provides control of an external inkjet printer mechanism (not shown) in communication with the inkjet printer interface 120B. The processor 420 controls a feed motor, a carrier motor, a position sensor, pulse width modulation channels, the data flow to the print mechanism, and print heads of the inkjet printer. The processor 420 periodically interacts with the CPU core 360. After interaction, the processor 420 handles the control of the above-listed items. An advantage of such an implementation is flexibility. By providing a processor to control the functionality of the inkjet mechanism, the system-on-a-chip controller 100 is configurable for use with any type of inkjet mechanism.

Figure 4A:
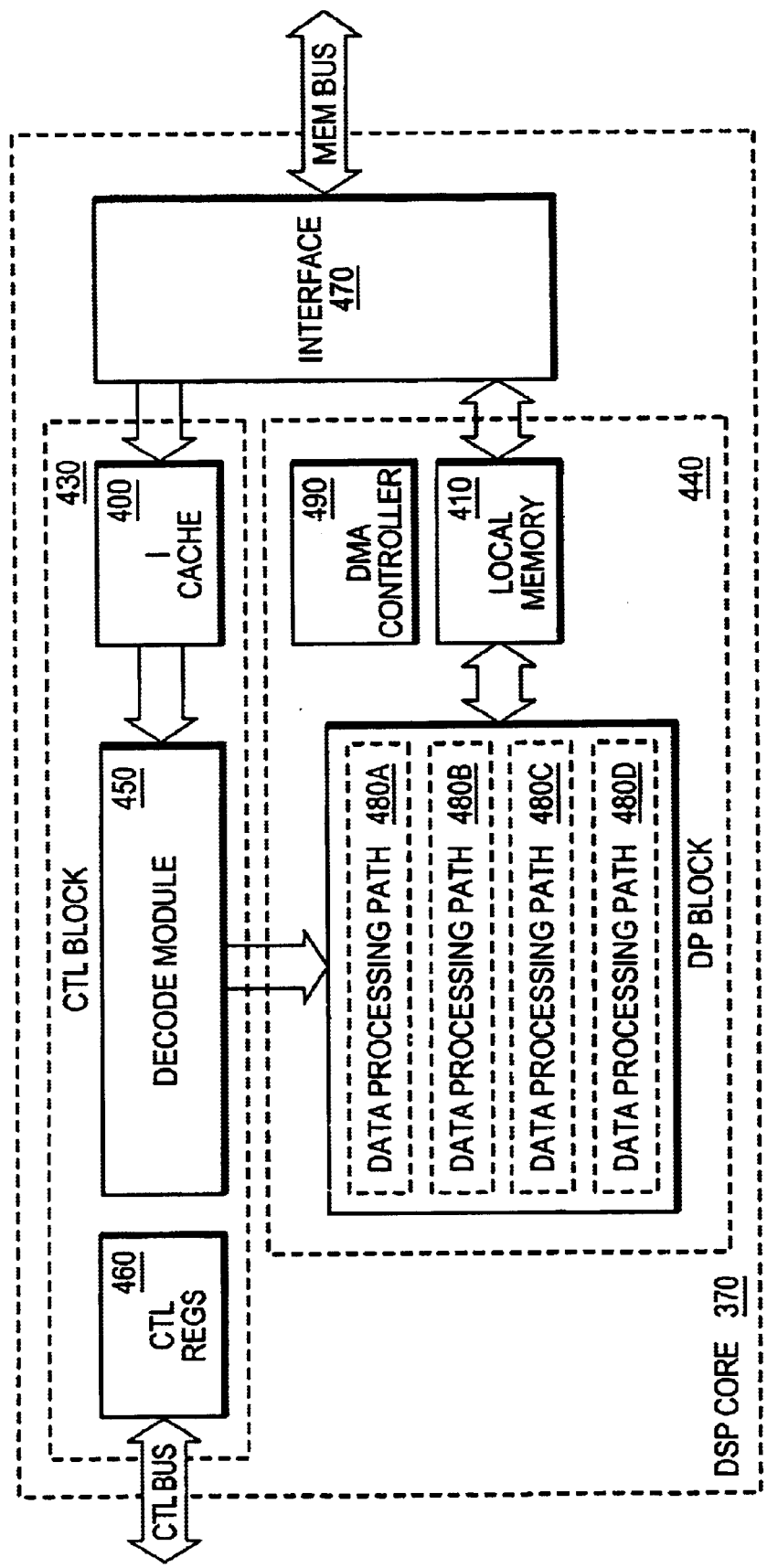
FIG. 4A is a block diagram of an embodiment of the DSP core of FIG. 2A.
Figure 4B:
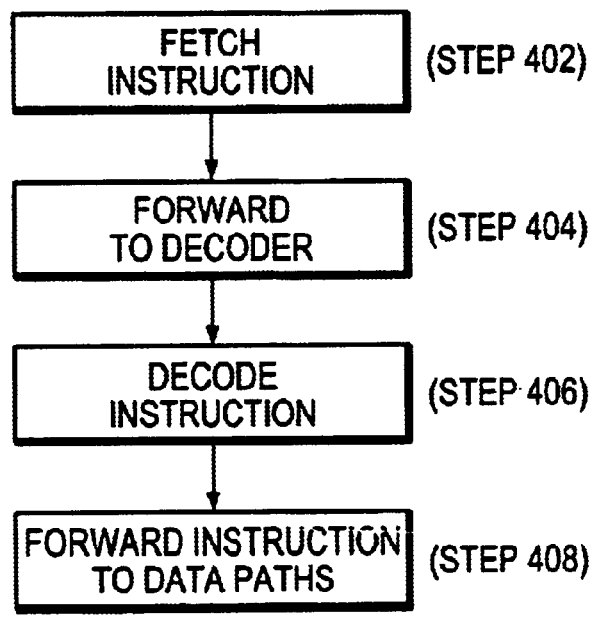
FIGS. 4B and 4C are flow charts of embodiments of the steps of operation of the DSP core of FIG. 4A.
Figure 4C:
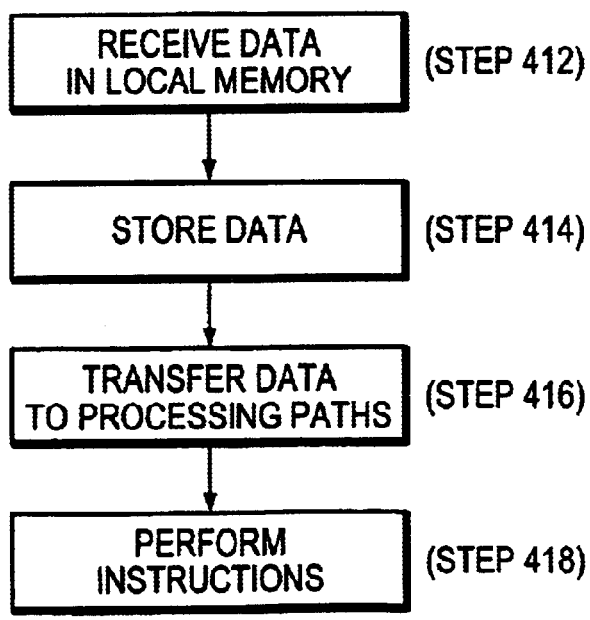

With reference to FIGS. 4A, 4B, and 4C, the DSP core 370 includes a control block 430 and a digital processing block 440. The control block 430 includes the instruction cache 410, an instruction decode module 450 and control registers 460. The instruction cache 400 is in communication with the system memory 175 through an interface 470.

In operation, instruction cache 400 fetches digital signal processing instructions from the SDRAM 175 (STEP 402). The instructions are transferred to the instruction decode module 450 (STEP 404). The instruction decode module 450 decodes the instruction (STEP 406) and forwards them for execution by the data processing paths 480 (STEP 408).

The digital processing block 440 includes the local memory 410, a plurality of data processing paths 480A, 480B, 480C, and 480D (referred to generally as the data processing path 480 or pipelines throughout the specification), and a direct memory access controller module 490. The local memory 410 is in communication with the interface 470 and the plurality of data processing paths 480.

In operation, the direct memory access controller module 490 provides for a direct transfer between system memory 175 and the local memory 410 via the interface 470 (STEP 412). The data is stored in the local memory according to one of two formats described in more detail below (STEP 414). The stored data is, in turn, transferred to the data processing paths 480 (STEP 416) and processed according the instructions provided by the instruction decode module 540 (STEP 416).

Figure 5A:
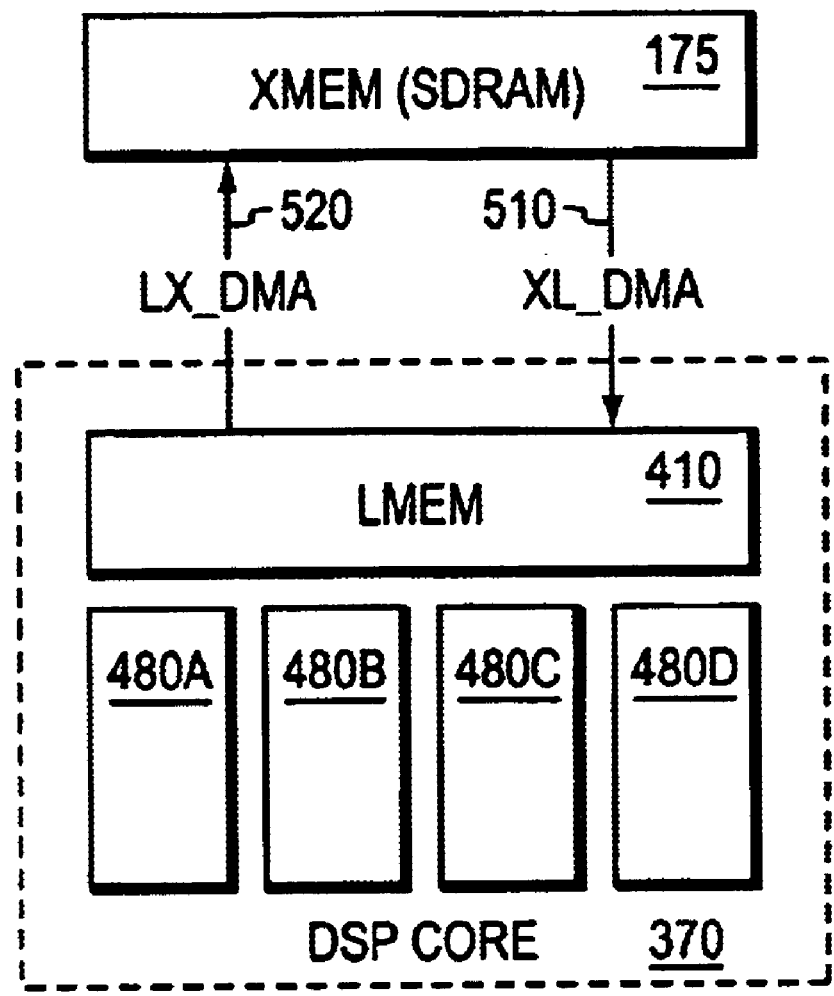
FIG. 5A is a block diagram of an embodiment of the digital processing module of FIG. 4A.

In accordance with another aspect of the invention, the manner in which the direct memory access controller 490 facilitates data transfers between the SDRAM 175 and how the data processing paths 480 access the stored data is described. With reference to FIG. 5A, the direct memory access controller 490 transfers data from the SDRAM 175 to the local memory 410 of the DSP core 370 through first direct memory access channel 510. The data is processed by the data processing paths 480. The direct memory access controller 490 returns the processed data to the SDRAM 175 via a second direct memory access channel 520. Both the first and second direct memory access channels 510 and 520 can operate in parallel to transfer data to and from the local memory 410. These transfers can occur while (i.e., in parallel) the data processing paths 480 process the data.

Each of the direct memory access channels 510 and 520 includes control registers for storing a source address, a destination address, and a length of the data. Direct memory access data transfers are in longword (e.g., 32 bit) units. Data in the system memory 175 is accessed linearly (also known as a row configuration). As described in more detail below, data in the local memory 410 can be accessed in either a linear (or row) configuration or an interleaved (or column) configuration.

In one embodiment, the direct memory access controller 490 facilitates data transfers into the local memory 410 in row configuration, and data transfers out to the external memory 170 in column configuration. Alternatively, direct memory access controller 490 facilitates data transfers into the local memory 410 in column configuration, and data transfers out to the external memory 170 in row configuration. Also, data can be transferred into and out of the local memory 410 in either the row or the column format. Additionally, data accessed in the system memory 175 can be broadcast stored in local memory. That is, a single piece of data in the system memory 175 can be stored in each column of the local memory in a single transfer.

The format in which the data is transferred to and from the system memory 175 is determined by a programmer of the system-on-a-chip controller 100. A control registers bit field is used to determine whether row or column mode is used to store the data in the local memory 410. Also, data transferred to and from the external memory 175 can be inverted, byte swapped, word swapped, or any combination thereof. Swapping can be specified independently for each direction. By facilitating data transfers in both row and column formats, the present invention provides advantages, such as facilitating the ability to access the data in parallel (i.e., speed), or accessing the entire local memory (i.e., flexibility), and memory utilization is not sacrificed With reference to FIGS. 5B and 5C, when row mode is chosen for storing the data in the local memory 410, the direct memory access module 480 transfers data to the local memory 410 and stores the data in sequential row locations. When the data is stored in column mode, it is stored sequentially in the same column (e.g., stored in column 542A of the local memory 410 before filling column 542B). In other words, the direct memory access controller 490 continuously transfers data from the system memory 175 to a first column (e.g., column 542A until the column 542A is filled). Once column 542A is full, the direct memory access module 480 transfers data from the system memory 175 to column 542B of the local memory 410.

Figure 5B:
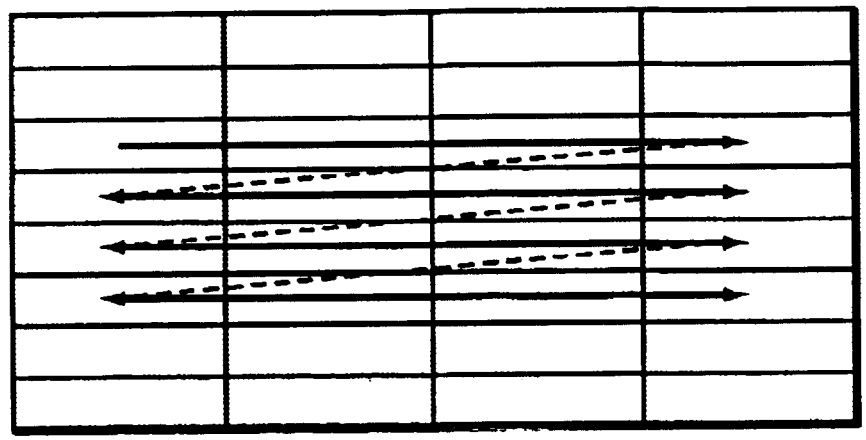
Figure 5C:
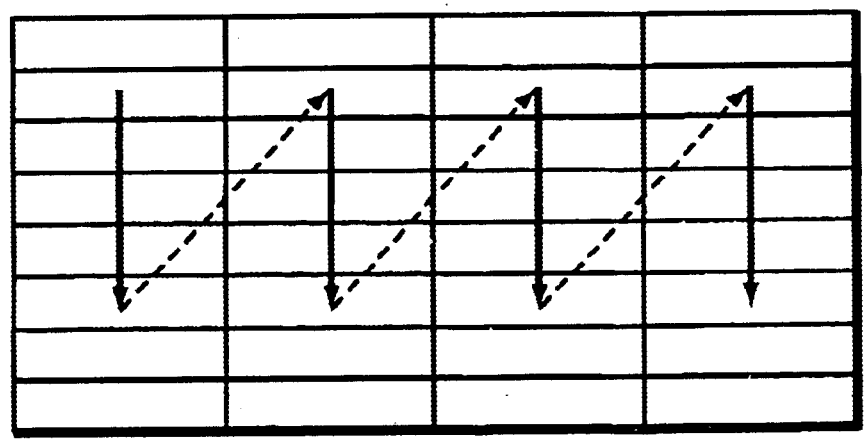
Figure 6:
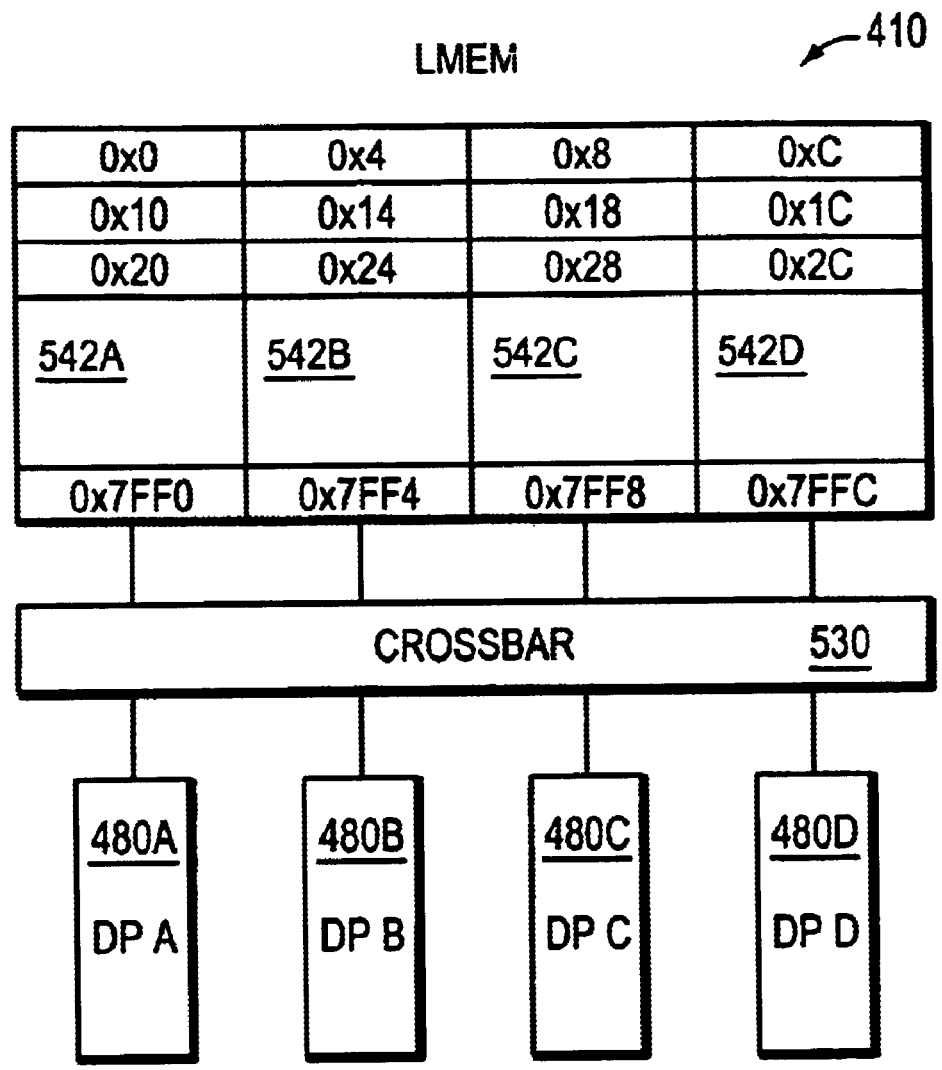
FIG. 6 is a block diagram of an embodiment of the local memory of the DSP core constructed in accordance with the principles of the invention.

With reference to FIGS. 6, 5B, and 5C, the digital processing block 440 (FIG. 4A) includes the local memory 410, a crossbar switch 530, a plurality of data processing paths 480A, 480B, 480C, 480D, and at least one corresponding address register 540 per data processing path 480. The crossbar switch 530 facilitates communication between the data processing paths 480 and the local memory 410. The corresponding address register 540 for each data path contains the local memory locations accessed by each data path 480. These locations are determined in response to instructions received from the control module 430. There are two instructions sets used to access the data stored in the local memory 410—a set of row mode instructions and a set of column mode instructions.

In one detailed embodiment, the local memory 410 can be 32 K bytes in size, although other sizes are within the scope of the invention. As shown, the local memory is divided into four 32-bit columns 542A, 542B, 542C, 542D (referred to generally as memory column 542). The number of memory columns 542 of the local memory typical corresponds to the number of data processing paths 480. This enables parallel processing of the data. The data can be accessed in the local memory 410 in either byte, word, or longword format (longword address boundaries are shown in FIG. 6).

With reference to FIG. 5B, when accessing data in row mode the data cannot be accessed in parallel by the plurality of data processing paths 480. Instead, a single data processing path 480A, for example, may access any location of the entire local memory 410 in a given clock cycle. During the subsequent clock cycle, data processing path 480B may access the same or another location in the local memory 410. Each of the plurality of data processing paths 480 accesses a location of the local memory 410 to retrieve a piece of data stored in the local memory 410. In this detailed example, it takes four clock cycles for the data processing paths 480 to each access the local memory 410 and retrieve a piece of data. After each of the data processing paths 480 retrieves a piece of data, the data processing paths 480 process the data according the instruction received from the control module 430. Because only a single data processing path 480 can access the local memory in a given clock cycle, row mode is typically used when large look-up tables need to be stored and accessed by the data processing paths 480.

With reference to FIG. 5C, when the data is stored in column mode, each data processing path 480 has access to one quarter of a scan line it is required to process. In column mode, each processing path accesses a respective memory column 542 during a single clock cycle. For example, data processing path 480A can access memory column 542A, data processing path 480B can access memory column 542B, data processing path 480C can access memory column 542C, and data processing path 480D can access memory column 542D. Alternatively, each data processing path 480 can "point to the right." That is, data processing path 480A accesses memory column 542B, data processing path 480B accesses memory column 542C, data processing path 480C accesses memory column 542D, and data processing path 480D accesses memory column 542A. Similarly, each data processing path can "point to the left." That is, data processing path 480A can access memory column 542D, data processing path 480B can access memory column 542A, data processing path 480C can access memory column 542B, and data processing path 480D can access memory column 542C. As such, four times the amount of data can be transferred in a single clock cycle to the data processing paths 480, as compared to transferring data in the row mode described above. As such, the parallel data transfers accomplished in column mode increase the throughput of the DSP core 370.

Figure 7:
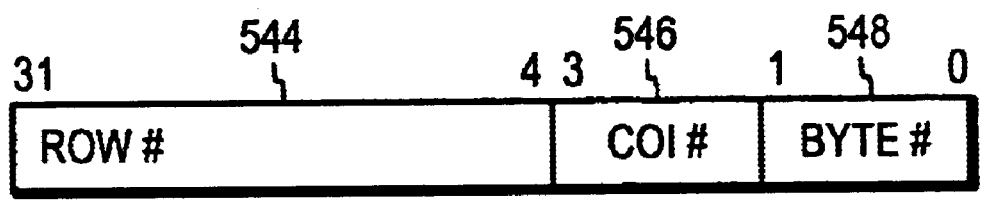
FIG. 7 is a graphical representations of an embodiment of the local address format.

With reference to FIG. 7, in more detail, the local memory addresses are stored in address registers 540 and include three fields: a row address field 544, a column address field 546, and a byte address field 548. The byte address field is two bits long (corresponding to the number of bytes in a longword) and the column address field is sized according to the number of data processing paths (as shown for this detailed example the field is two bits long corresponding to four data processing paths).

When the data processing path 480 accesses the local memory 410 in response to a row mode I/O instruction, the address register 540 is updated by adding a value scaled to the size of the transfer directly to the present address value (e.g., one for a byte transfer, two for a word transfer, and four for a longword transfer). Thus, the data processing path 480 advances through memory in row order.

Alternatively, when the data processing path 480 accesses the local memory 410 in response to a column mode I/O instruction, the address register 540 for each processing path is updated without changing the bits in the column address field 546. For example, a longword I/O access causes only the row address field 544 to change, and a byte I/O access only affects the row address field 544 and the byte address field 548. As a result, data access is restricted to a single column 542 of the local memory 410, and the proper increment for sequential parallel local memory access is fully transparent to the programmer.

Figure 8A:
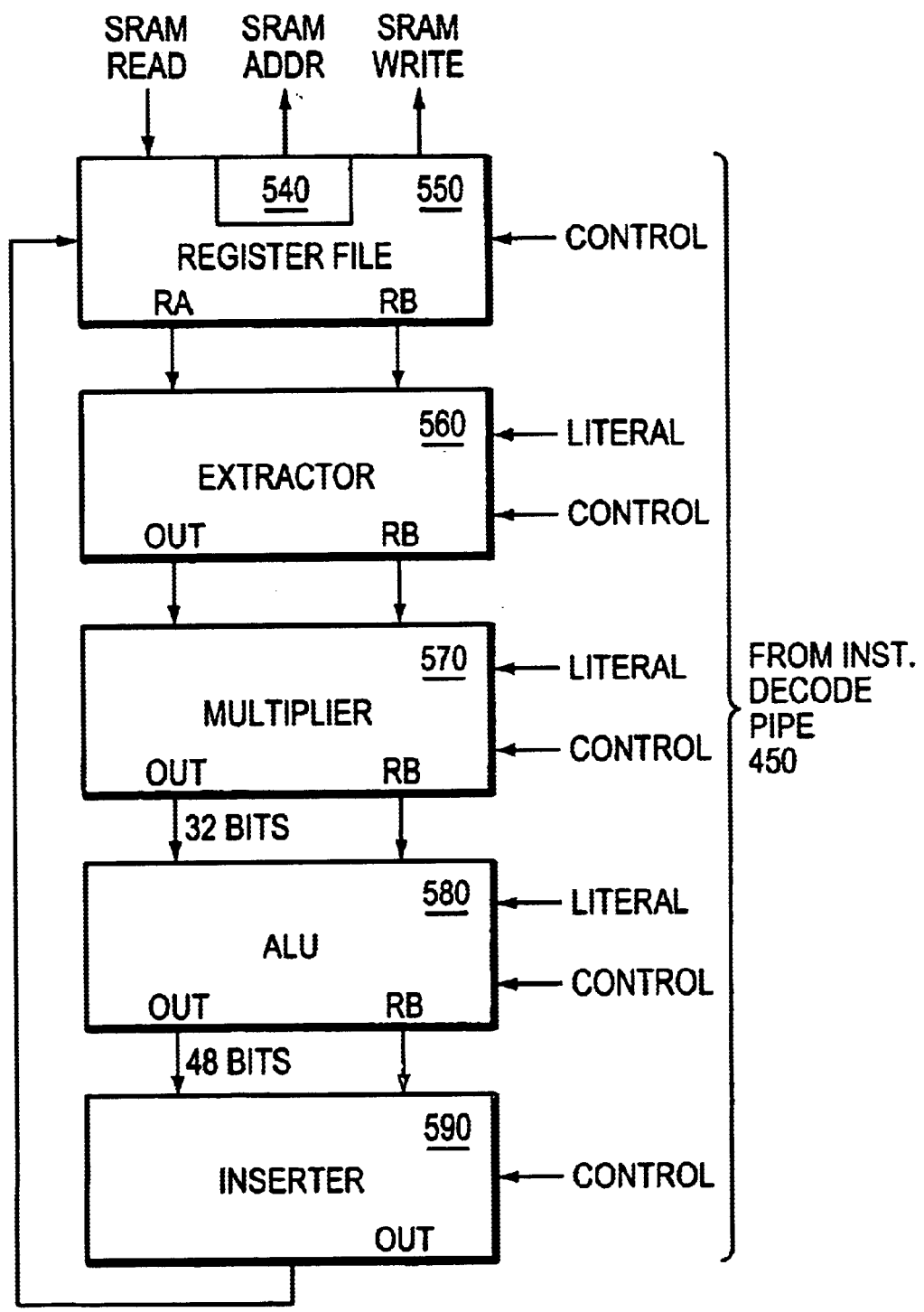
FIG. 8A is a block diagram of an embodiment of a data processing path constructed in accordance with the principles of the invention.

With reference to FIG. 8A, each data processing path 480 consists of a register file 550 and four processing stages (execution units) an extractor stage 560, a multiplier stage 570, an arithmetic logic unit (ALU) stage 580, and an inserter stage 590. Each stage provides a specific processing function as described below.

Figure 8B:
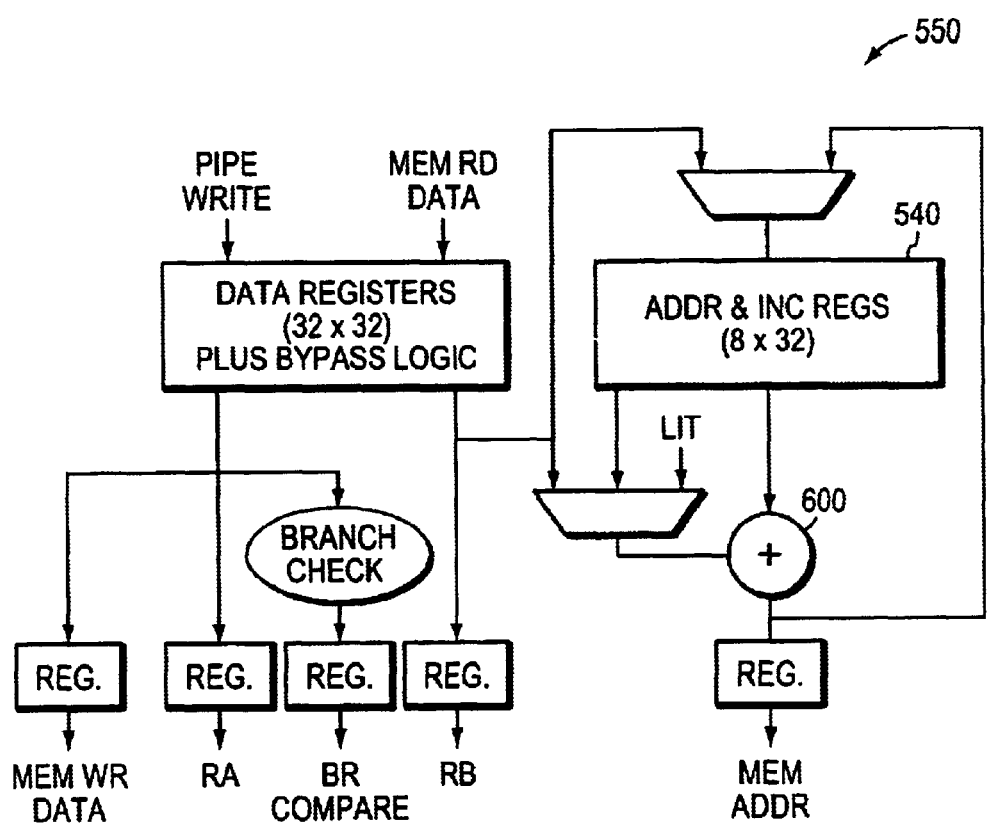
FIG. 8B is a block diagram of an embodiment of the register file of FIG. 8A.

With reference to FIG. 8B, in one detailed embodiment the register file 550 can be a 32×32 register file having four independent ports, two read ports and two write ports, although other configurations are within the scope of the invention. This enables data from the local memory 410 to be written to the register file 550 and the processed data to be written to the local memory 410 simultaneously. Additionally, each register file 550 includes an address register set 540 and a dedicated adder 600. In one detailed embodiment, the address register set 540 can include eight 32-bit registers, although other configurations are within the scope of the invention. The local memory addresses for reads and writes are sourced from the address register sets 540. This allows address updates to be executed in one clock cycle and thereby increases the processing speed and bandwidth of the DSP core 370. The address register set 540 and the adder 600 perform the increment or decrement function described above in FIG. 7. The adder 600 either adds a value to or subtracts a value from the current local memory address being accessed, in response to the column access or row access instruction thereby determining the next local memory address to be accessed.

Referring back to FIG. 8A, the extractor stage 560 extracts individual values (e.g., pixels, coefficients) from the 32-bit word. The width of the data element is programmable, as is the initial position and increment value.

The multiplier stage 570 provides traditional multiplier functionality. That is, the output of the extractor stage 560 can be multiplied by a literal, a register, or pass through unaltered by the multiplier stage 560. In a detailed embodiment, the size of the multiplier stage can be 32 bits by 16 bits with a 32 bit output, although other configurations are within the scope of the invention.

The multiplier stage 570 passes its output to the ALU stage 580. In one detailed embodiment, the width of the ALU stage can be 48 bits, although other configurations are within the scope of the invention. The ALU stage 580 performs traditional ALU functions, such as, AND, OR, XOR, NOT, addition, subtraction. In addition, count leading ones/zeros and quad compare can be performed by the ALU stage.

The inserter stage 590 receives the output of the ALU stage 590. The inserter stage 590 provides functionality similar to the extractor stage 560. The inserter stage 590 extracts a filed from the output of the ALU stage 580 and inserts it into a special register within the inserter (not shown). In turn, the insert then sends the result stored in the special register to one of the 32 bit registers of the register file 550 to be returned to the local memory 410.

The decoder module 450 (FIG. 4A) provides the instructions to processes the data to each stage of the pipeline. The instructions can generally be classified into different classes, such as, operate instructions, memory instructions, control flow instructions, conditional executions, and miscellaneous instructions. Operate instructions are arithmetic instructions that operate across all data processing paths 480. Memory instructions are used for transferring data between registers and local memory, as well as accessing registers. Examples of control flow functions include branches, call/return and halt instructions. Conditional execution instructions allow single or groups of instructions to be executed on a per data processing paths basis. Miscellaneous instructions include, for example, load/store instructions for accessing special registers in the data processing paths, and various register to register transfers, such as a register broadcast (i.e., one register to many registers).

In accordance with another aspect of the invention, it is possible to create and decode instruction words that include an I/O instruction (e.g., memory read) in an unused bit field of a fixed length instruction word that also includes an operation instruction. As such, data can be read into or written from the register file 530 in parallel with the execution of the operation instruction by the various stages of the pipeline. Previously, a separate instruction and a clock cycle was needed to issue the I/O instruction to read data from or write data to the local memory thereby delaying the availability of the I/O instructions result and the issuing of subsequent instructions.

Figure 9A:
FIGS. 9A and 9B are graphical representations of embodiment of instructions words constructed in accordance with the principals of the invention.
Figure 9B:
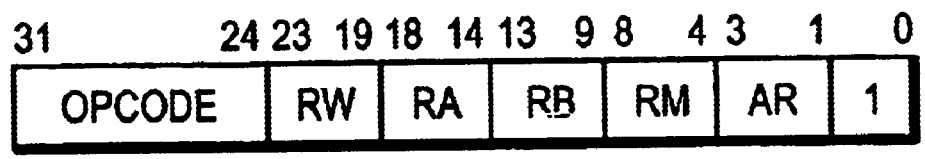

With reference to FIG. 9A, in one detailed embodiment the instruction words are 32 bits long. The upper 8 bits (bit numbers 31–24) are the opcode. The remaining bits vary depending on the instruction opcode. With reference to FIG. 9B, in one embodiment of a super-imposed I/O instruction, the decoded instruction word is 32 bits long. Bits 31–24 are the designated operation instruction. Bits 23–19 define the register to which the processed result is written. Bits 18–14 define the first operand. Bits 13–9 define the second operand. Bits 8–4 define the register to which the results of the local memory read are written. Bits 3–1 define which address register 540 to use to determine which local memory address to access. Bit 0, when set to 1, indicates a parallel memory access. That is, each data processing path 480 will the same operation and also perform a local memory access.

In one embodiment, if an operation instruction attempts to execute when the data it is to operate on is not available yet (because the instruction providing the data has not yet completed), the pipeline will stall and wait for the data to become available.

While the invention has been particularly shown and described with reference to specific preferred embodiments, it should be understood by those skilled in the art that various changes in form and detail can be made therein without departing from the spirit and scope of the invention as defined in the appended claims.

What is claimed is:

1. A method of formatting data in a local memory of a digital signal processor for use by a plurality of data processing paths comprising the steps of:
   receiving data from a first external data location in a first format or a second format;
   storing the data in the local memory in a row configuration when the data is received in the first format, the data stored in the row configuration being accessible by each respective data processing path sequentially; and
   storing the data in the local memory in a column configuration when the data is received in the second format, the data stored in the column configuration being accessible by a respective one of the plurality of the data processing paths in parallel.

2. The method of claim 1, wherein the step of receiving data comprises receiving data from a first external data source selected from the group consisting of a camera, a scanner, a printer, a fax modem, a parallel flash memory, a serial flash memory, a DRAM, a universal serial bus host, a network device, and an IEEE 1394 device.

3. The method of claim 1, wherein the received data is stored in both the row configuration and the column configuration in the local memory.

4. The method of claim 1, wherein the step of receiving data from an external data location comprises receiving data through a direct memory access module.

5. The method of claim 4, where the step of receiving data further comprises receiving data by at least one of inverting, byte swapping, and word swapping.

6. The method of claim 1 further comprising the step of formatting the data, by the direct memory access module, in either the first format or the second format.

7. The method of claim 6 wherein the step of formatting the data comprises setting a bit field by a programmer, the bit field being indicative of whether to format the data in the first format or the second format.

8. The method of claim 1 further comprising the step of transferring a portion of the data stored in the row configuration to a single one of the plurality of data paths during a clock cycle.

9. The method of claim 8 further comprising the step of repeating the step of transferring a portion of the data stored in the row configuration to a single one of the plurality of data paths during a clock cycle for each of the plurality of data processing paths.

10. The method of claim 9 further comprising the step of processing, by each of the data processing paths, the data in each of the plurality of processing paths to thereby generate processed data.

11. The method of claim 10, wherein the step of processing comprising processing the data in a size selected from the group consisting of byte, word, and longword.

12. The method of claim 10 further comprising the step of updating at least one address register associated with each respective data processing path.

13. The method of claim 12, wherein the step of updating comprising incrementing or decrementing at least one address register associated with each respective data processing path by a size selected from the group consisting of a byte, a word, and a longword.

14. The method of claim 10 further comprising the step of transferring the processed data to a second external data location in either the first format or the second format.

15. The method of claim 1 further comprising the step of transferring a portion of the data stored in each respective column of the column configuration to a corresponding data processing path of the plurality of data processing paths in parallel during a clock cycle.

16. The method of claim 15 further comprising the step of processing, by each data processing paths, the data received from the respective column of the column configuration.

17. The method of claim 16, wherein the step of processing comprises processing the data in a size selected from the group consisting of a byte, a word, and a longword.

18. The method of claim 16 further comprising the step of updating at least one address register associated with each respective data processing path.

19. The method of claim 18, wherein the step of updating comprises incrementing or decrementing at least one address register associated with each respective data processing path by a size selected from the group consisting of a byte, a word, and a longword.

20. The method of claim 16 further comprising the step of transferring the processed data to a second external data location in either the first format or the second format.

21. The method of claim 1, wherein the step of receiving data from an external location comprises receiving data from an external location in a longword size.

22. The method of claim 1 further comprising the steps of broadcasting the data to the local memory when the data is received in the first format; and storing the broadcast data in the local memory in the column configuration.

23. A digital signal processor core comprising:

a crossbar switch;

a local memory in communication with the crossbar switch, the local memory being configured to store data received from an external memory in a first format or a second format, the first format being a row format and the second format being a column format; and a plurality of data processing paths in communication with the crossbar switch, each one of the plurality of data processing paths being able to sequentially access any portion of the local memory when the data is stored in the first format or a respective subset of the local memory in parallel when the data is stored in the second format via the crossbar switch.

24. The digital signal processor of claim 23 further comprising a direct memory access module in communication with the local memory configured to format the data to be stored in the local memory in either the first format or the second format.

25. The digital signal processor of claim 23 further comprising at least one address register unit associated with each of a respective one of the plurality of data processing paths.

26. The digital signal processor of claim 25, wherein each of the address registers comprises a local memory address of data to be processed by the respective data processing path.

27. The digital signal processor of claim 25, wherein the at least one address register is configured to be incremented by a data size selected from the group consisting of a byte, a word, and a longword.

28. The digital signal processor of claim 23 further comprising a decode module in communication with the plurality of data processing paths, the decode module being configured to decode an instruction word into an operation instruction and an I/O instruction.

29. The digital signal processor of claim 28, wherein the I/O instruction is disposed in an unused bit field of the operation instruction.

30. The digital signal processor of claim 23, wherein each of the plurality of data processing paths comprises a register file module, an extractor module, a multiplier module, an arithmetic logic unit module, and an inserter module, each of the modules being configured to provide data processing on the data stored in the local memory.

* * * * *